(12) United States Patent
Hartman

(10) Patent No.: US 8,374,781 B2
(45) Date of Patent: Feb. 12, 2013

(54) METHOD FOR VEHICLE ROUTE PLANNING

(75) Inventor: Peter G. Hartman, Bloomfield, MI (US)

(73) Assignee: Chrysler Group LLC, Auburn Hills, MI (US)

(*) Notice: Subject to any disclaimer, the term of this patent is extended or adjusted under 35 U.S.C. 154(b) by 786 days.

(21) Appl. No.: 12/500,498

(22) Filed: Jul. 9, 2009

(65) Prior Publication Data
US 2010/0010732 A1     Jan. 14, 2010

Related U.S. Application Data

(60) Provisional application No. 61/079,299, filed on Jul. 9, 2008.

(51) Int. Cl.
G06F 19/00 (2011.01)

(52) U.S. Cl. ........ 701/439; 701/123; 701/410; 701/414; 701/418; 701/419; 701/423; 701/425; 701/428; 701/527

(58) Field of Classification Search .................. None
See application file for complete search history.

(56) References Cited

U.S. PATENT DOCUMENTS

| | | | |
|---|---|---|---|
| 5,568,390 A | 10/1996 | Hirota et al. | |
| 5,742,922 A * | 4/1998 | Kim | 701/423 |
| 5,913,917 A * | 6/1999 | Murphy | 701/123 |
| 6,085,147 A | 7/2000 | Myers | |
| 6,092,021 A * | 7/2000 | Ehlbeck et al. | 701/123 |
| 6,256,577 B1 | 7/2001 | Graunke | |
| 6,282,486 B1 | 8/2001 | Bates et al. | |
| 6,484,088 B1 | 11/2002 | Reimer | |
| 6,594,576 B2 | 7/2003 | Fan et al. | |
| 8,135,538 B2 * | 3/2012 | Geelen et al. | 701/123 |
| 2003/0110075 A1 | 6/2003 | Shioda et al. | |
| 2005/0055157 A1* | 3/2005 | Scholl | 701/207 |
| 2007/0005237 A1* | 1/2007 | Needham et al. | 701/202 |
| 2007/0276582 A1 | 11/2007 | Coughlin | |
| 2008/0125958 A1* | 5/2008 | Boss et al. | 701/123 |
| 2008/0221787 A1* | 9/2008 | Vavrus | 701/201 |
| 2008/0270016 A1* | 10/2008 | Proietty et al. | 701/123 |

* cited by examiner

Primary Examiner — Khoi Tran
Assistant Examiner — Bao Long T Nguyen
(74) Attorney, Agent, or Firm — Ralph E. Smith

(57) ABSTRACT

A method of planning a vehicle route includes estimating fuel requirements of identified alternative routes or route segments using navigation, vehicle, and powertrain information. The method also includes displaying for a vehicle operator a list of alternate routes that features either absolute or relative values representative of such estimated fuel requirements. The method further includes adapting values used to estimate fuel requirements based upon current powertrain operating parameters, and alerting the vehicle operator when actual vehicle fuel economy along a selected route varies significantly from the estimated fuel requirement.

12 Claims, 2 Drawing Sheets

22

PLEASE SELECT PREFERRED ROUTE:

| | ETA | FUEL USED |
|---|---|---|
| FASTEST | 1:25 PM | 1.6 GAL. |
| SHORTEST | 1:29 PM | 1.25 GAL |
| BEST FUEL ECONOMY | 1:31 PM | 1.20 GAL. |
| SCENIC | 1:41 PM | 1.40 GAL. |

24

PLEASE SELECT PREFERRED ROUTE:

| | DRIVE TIME | FUEL SAVINGS |
|---|---|---|
| BEST FUEL ECONOMY | 0:34 HRS | 27.3% |
| SHORTEST | 0:32 HRS | 24.2% |
| SCENIC | 0:44 HRS | 15.2% |
| FASTEST | 0:28 HRS | -- |

METHOD FOR VEHICLE ROUTE PLANNING

CROSS REFERENCE TO RELATED APPLICATIONS

This application claims benefit of U.S. provisional patent application No. 61/079,299 filed Jul. 9, 2008, the disclosure of which is hereby incorporated by reference.

FIELD OF THE INVENTION

The invention relates to methods for planning a route to be driven by a vehicle, as suggested by an electronic navigation system.

BACKGROUND OF THE INVENTION

Vehicles are often equipped with an electronic navigation system that provides the vehicle operator with information regarding the vehicle's location using global positioning system (GPS) signals and associated map data. Most known electronic navigation systems permit the vehicle operator to specify waypoints or endpoints for a given trip, whereupon the electronic navigation system identifies a route by which the vehicle operator may drive to the desired waypoints and endpoint, typically using a preprogrammed, operator-selected criterion such as "fastest route," "shortest route," "avoid highways," "scenic route," and "low-traffic route."

SUMMARY OF THE INVENTION

Under the invention, a vehicle's electronic navigation system utilizes navigation information and vehicle and/or powertrain information to identify one or more routes that a vehicle operator may take to arrive at a desired destination which achieves increased vehicle fuel economy, i.e., that will use less fuel, or that results in reduced vehicle emissions, e.g., reduced $CO_2$ emissions. Thus, in a first exemplary method for practicing the invention, the electronic navigation system estimates the fuel requirements of each potential route segment based on such navigation, vehicle, and powertrain information as route segment distances, speed limits, grades, hills, and altitude (including the extent to which the powertrain can be operated in a special fuel-efficient mode, such as a deactivated cylinder mode, to achieve greater vehicle fuel economy over a given segment); the number and type of intersections and traffic signals along each route segment, and an estimated delay associated with each such intersection or traffic signal (including the extent to which the engine may be turned off for a brief period of time at such intersections); vehicle speed, and ambient temperature and pressure (perhaps as detected or determined by the vehicle's powertrain controller); and predicted powertrain operating parameters for a given route segment including engine speed, transmission selected gear, and the state of any lockup torque converter, and any engine operation in a deactivated cylinder mode.

In accordance with an aspect of the invention, the first exemplary method estimates vehicle fuel consumption based upon calibratable values for a given vehicle, preferably as periodically adapted using detected or determined vehicle and/or powertrain operating parameters in order to reflect actual vehicle fuel consumption or fuel economy along a given route segment. Thus, in a system for practicing the exemplary method, the electronic navigation system includes memory, such as a nonvolatile RAM, for storing actual or "learned" values for the vehicle and powertrain information that are collected when the vehicle travels over a given route segment, for subsequent use in identifying fuel-efficient routes.

By way of further example, in the first exemplary method, such learned values include actual vehicle speeds as compared to "posted" speed limits; and values representative of the individual driving pattern for a given vehicle operator, including values representing the vehicle operator's typical acceleration and deceleration rates, and the typical percentage(s) of the estimated delay associated with intersections and traffic signals experienced by the vehicle operator (as where the vehicle operator is particularly adept at negotiating a series of green traffic signals along a given route segment); and time- and/or fuel-weighted fuel consumption as a function of vehicle speed. The first exemplary method also includes storing learned values for other vehicle and powertrain operating parameters, including values representing the vehicle's drag coefficient and/or rolling resistance at various vehicle speeds (thereby reflecting the presence, for example, of such drag-enhancing or drag-reducing body features, and tire selection); fuel quality, e.g., whether an ethanol blend or other flexible fuel is being used in the vehicle rather than gasoline; and typical percentage of accessory loads (thereby reflecting, for example, operation of the vehicle in a warm climate necessitating use of the vehicle's air conditioning).

In accordance with another aspect of the invention, the vehicle's electronic navigation system preferably also receives vehicle traffic information from an external source, such as an FM Traffic Message Channel (TMC) receiver. Thus, the first exemplary method includes calculating or modifying the estimated values for route segment fuel usage based on available vehicle traffic information including the presence and impact along a given route/route segment of any identified construction zones, traffic congestion, and accidents on vehicle starting/stopping and route segment speed limits.

In accordance with yet another aspect of the invention, the first exemplary method includes transforming navigation information regarding each route or route segment from miles and time into the volume (gallons or liters) or mass (pounds) of fuel used for each route or route segment. The volume or mass of fuel for each route or route segment can then be used as a further input criterion to a known electronic navigation system route optimizer. The resulting "fuel savings" achieved by taking one planned route over another is then advantageously displayed to the vehicle operator to facilitate his selection of a desired route, either as a relative percentage of another route, or in actual volume or mass of fuel "saved."

In accordance with a further aspect of the invention, once a vehicle operator begins driving a selected route, the first exemplary method preferably further includes monitoring the actual fuel consumption of the vehicle along the selected route. The first exemplary method also preferably includes alerting the vehicle operator if an observed fuel economy differs significantly from the estimated fuel economy for any of its segments and, perhaps, may trigger another opportunity for the vehicle operator to select another route that, due to either his "driving style" or transitory conditions such as traffic congestion, might otherwise provide greater vehicle fuel economy. In this way, the vehicle operator advantageously receives feedback on vehicle fuel economy when driving each route segment, such that the vehicle operator may use that information either to modify his "driving style" to improve vehicle fuel economy in real time, or to otherwise be prompted to select another route to thereby enhance the actual vehicle fuel economy achieved during the trip.

By way of further example, in a second exemplary method for practicing the invention, the electronic navigation system estimates the fuel requirements of each potential route segment based on navigation information including GPS signals and map data, such as route segment distances, speed limits, grades, hills, altitudes, intersections, and traffic signals, as well as on vehicle information including the vehicle's mass, drag coefficient, and rolling resistance (the values for which are either calibratable values for the vehicle or, preferably, learned values). Thus, the electronic navigation system will advantageously factor specific vehicle characteristics into its fuel requirements estimates. It will be appreciated, for example, that the correlative use of both navigation and vehicle information allows for more accurate estimates of vehicle fuel requirements, particularly where a proposed route segment includes many vehicle stops/starts and/or significant elevation changes. If the vehicle's electronic navigation system is capable of receiving vehicle traffic information from an external source, the second exemplary method would also include calculating or modifying the fuel requirement estimates based on available vehicle traffic information, as previously described in connection with the first exemplary method.

Other objects, features, and advantages of the present invention will be readily appreciated upon a review of the subsequent description of the preferred embodiment and the appended claims, taken in conjunction with the accompanying Drawings.

DETAILED DESCRIPTION OF THE PREFERRED EMBODIMENT

Figure 1:
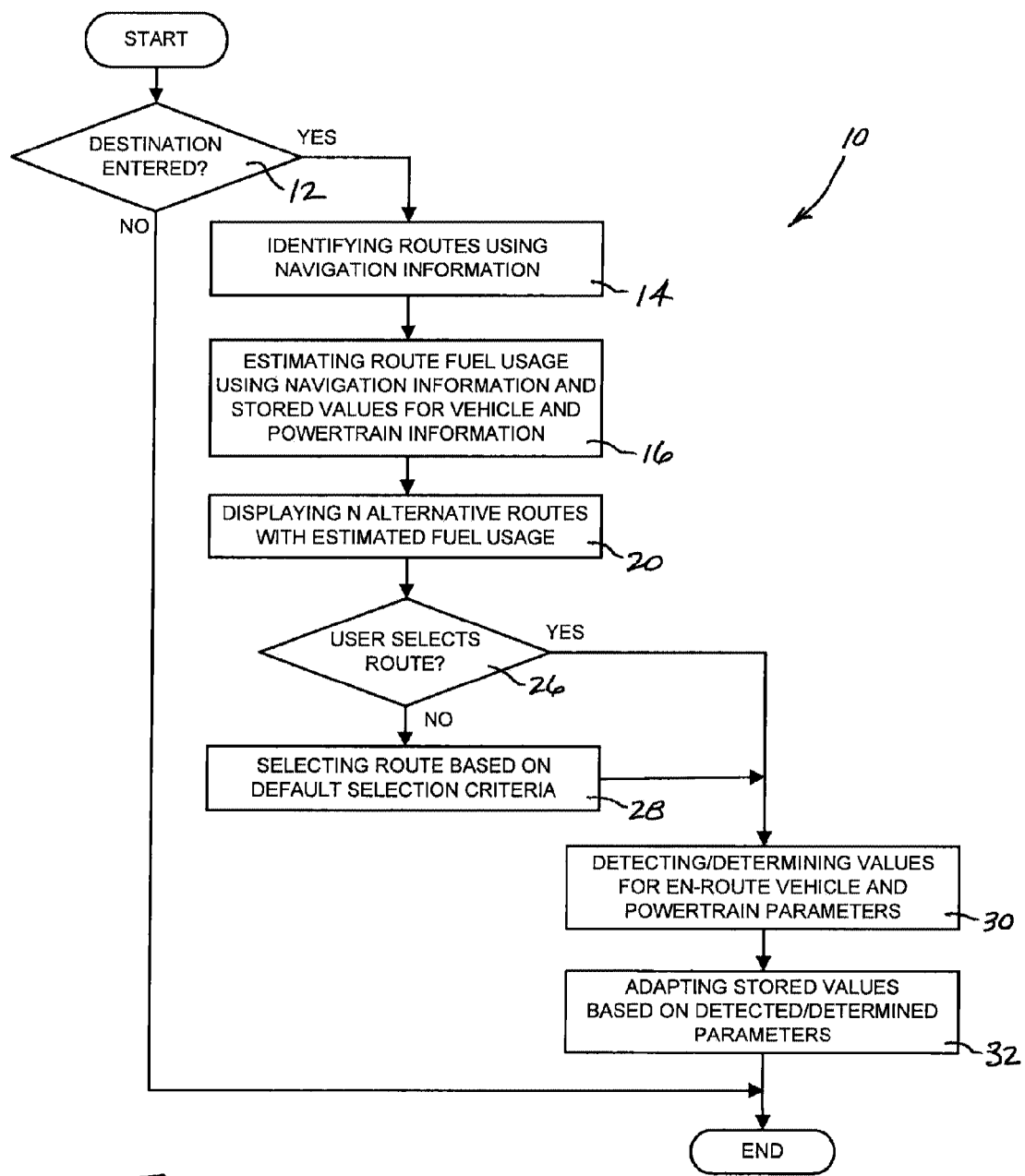
FIG. 1 is a flow chart illustrating the main steps of an exemplary method for practicing the invention.

Referring to FIG. 1, an exemplary route planning method 10 is provided for a vehicle having an electronic navigation system and a powertrain including an engine, an automatic transmission coupled to the engine through a lock-up torque converter, and a powertrain controller. Once the user has entered a desired destination into the electronic navigation system at step 12 using, for example, a touch screen graphical user interface (GUI), the exemplary method 10 includes identifying available route segments at step 14 that together define a plurality of available routes from the vehicle's current location, as determined in a known manner from received GPS signals and map data (collectively "navigation information"), to the destination.

At step 16, the electronic navigation system estimates the fuel requirements for each route/route segment using vehicle and powertrain fuel consumption information, as supplied to the electronic navigation system by the vehicle's powertrain controller. While the invention contemplates the use of simplified fuel consumption information from the powertrain controller, for example, such as a fuel consumption value based solely on the vehicle's speed along each route/route segment, as illustrated by plot 18 in FIG. 2, in the exemplary method 10, the powertrain controller advantageously provides fuel consumption information to the electronic navigation system as a function of vehicle speed, engine speed, engine load, ambient temperature, transmission coolant temperature, transmission selected gear, the state of any lockup torque converter, ambient pressure, and other suitable vehicle or powertrain operating parameters.

The fuel consumption information is stored by the electronic navigation system, for example, as calibratable values stored in a lookup table. The electronic navigation system reads appropriate stored values for fuel consumption information for each route segment (or, perhaps, each route sub-segment) based, for example, on the route segment's characteristics as derived from navigation information. The exemplary method 10 thus takes into account navigation information regarding posted vehicle speed limits, changes in altitude and/or grade (rate of change of altitude), and the number of anticipated vehicle starts and stops due, for example, to traffic signals, reported road construction, and reported accidents along each route segment to provide a more accurate estimate of vehicle fuel consumption along that route segment (and, correlatively, along the entire route).

At step 20, the electronic navigation system displays N alternative routes, including the route with the lowest estimated fuel requirements, and a plurality of other alternative routes that are preferably selected according to predetermined criteria, for example, as preselected by the vehicle operator. By way of example only, FIGS. 3 and 4 respectively depict a touch screen display 22,24 of the electronic navigation system as the system performs step 20 of FIG. 1, showing a "best fuel economy" route as well as several alternate routes. It will be appreciated that the alternative routes are preferably rank-ordered and displayed according to user preference, for example, by estimated time of arrival (ETA), or by vehicle fuel economy (and perhaps prominently featuring the best fuel economy route as the first-listed route, and with the least fuel-efficient route listed last).

Figures 2, 3, 4:
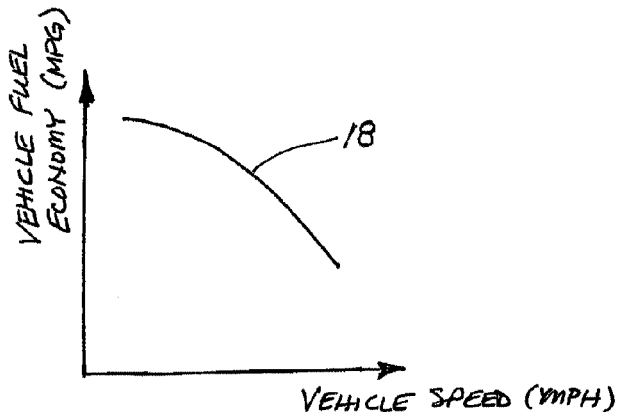
FIG. 2 is a plot of a vehicle fuel consumption versus vehicle speed for a typical gasoline-powered automobile.
FIG. 3 is an illustration of a touch screen display for an electronic navigation system employing a graphical user interface, displaying to the vehicle operator a selection of alternative routes featuring different fuel requirements.
FIG. 4 is an illustration of a touch screen display for an electronic navigation system, similar to that of FIG. 3, displaying the alternative routes with relative fuel economy information.

Thus, the display 22 of FIG. 3 will be seen to list several alternate routes, including a fastest route, a shortest route, a scenic route (perhaps including a hilly winding road), and a "best fuel economy" route, sorted by estimated arrival time (ETA), and correlatively displaying estimated fuel requirements for each alternate route. In FIG. 4, the display 24 lists these same four alternate routes, except that the alternate routes are sorted by estimated route drive time while correlatively displaying estimated fuel usage as a relative percentage of the fuel requirements of a baseline route (for FIG. 4, the baseline route is the "fastest route," as the least-fuel-efficient route).

Preferably, the best fuel economy route is always be displayed, at least as an option, to inform the vehicle operator of the relative fuel inefficiency of alternate routes. Additionally, the electronic navigation system preferably automatically sets the best fuel economy route as the default criterion, for example, when an "economy mode" automatic transmission shift schedule is selected by the vehicle operator to thereby further enhance vehicle fuel economy. The display 22,24 may also optionally display alerts to the vehicle operator when the vehicle is en route, for example, to indicate the manner in which his "driving style" is impacting estimated fuel economy.

At step 26, after the vehicle operator has selected the desired route from among those displayed on the electronic navigation system's touch screen (or after a predetermined period, once the electronic navigation system automatically selects one of the alternate route, or perhaps even the most fuel efficient route, by default at step 28), the powertrain controller detects or otherwise determines values for vehicle and powertrain operating parameters at step 30 while the vehicle is en-route to the destination along the selected route.

At step 32, the electronic navigation system obtains the en-route values for the vehicle and powertrain operating parameters from the vehicle's powertrain controller and thereafter adapts or otherwise modifies the stored values for vehicle and powertrain information using the en-route values. It will be appreciated that step 32 may be performed while the vehicle is en route and/or after the vehicle has reached the user-entered destination. It will also be appreciated, that, because the exemplary method 10 estimates vehicle fuel consumption based upon calibratable values for a given vehicle, as either supplemented or adapted by detected or determined vehicle and powertrain operating parameters, the exemplary method 10 is able to more accurately estimate vehicle fuel requirements along any given route/route segment, both due to the vehicle and powertrain operating parameters and such other factors as the "driving style" of the vehicle operator (as that "driving style" is reflected in the learned values stored in the lookup table).

It will also be appreciated that the electronic navigation system will likewise utilize, in its estimates of route fuel requirements, information relating to current driving conditions, such as the passage of a given route through construction areas, accident information, traffic congestion experienced at various times of the day or week during given route segments, and any other traffic or navigation information that indicates that driving a particular route or route segment will be anything other than "typical.".

While the above description constitutes the preferred embodiment, it will be appreciated that the invention is susceptible to modification, variation and change without departing from the proper scope and fair meaning of the subjoined claims.

What is claimed is:

1. A method for operating an electronic navigation system to display to a vehicle operator a plurality of alternate vehicle travel routes between an identified starting point and an identified endpoint, wherein the electronic navigation system includes a computer readable medium storing navigation information including a plurality of route segments, distances of each of the plurality of route segments, speed limits of each of the plurality of route segments, grade changes of each of the plurality of route segments, altitudes of each of the plurality of route segments, and number and type of intersections and traffic signals encountered in each of the plurality of route segments, and wherein the vehicle includes an engine, a transmission, and a vehicle controller adapted to supply powertrain information to the navigation system, the method comprising:

storing the powertrain information supplied by the vehicle controller as a function of vehicle speed, the powertrain information including a transmission selected gear, a state of any lockup torque converter of the vehicle, a state of a fuel-savings engine operating mode of the vehicle, an achieved fuel economy of the vehicle, and a fuel quality of fuel being used in the vehicle;

identifying a plurality of alternate routes from the identified starting point and the identified ending point based on the navigation information, each alternate route of the plurality of alternate routes including at least one of the plurality of route segments; and estimating an amount of fuel required to travel along each alternate route of the plurality of alternate route based on the navigation information and on the powertrain information.

2. The method of claim 1, further including adapting stored values for the powertrain information using instantaneous powertrain information.

3. The method of claim 1, wherein the vehicle controller is further adapted to supply calibrated vehicle information representative of at least one of the group consisting of a vehicle mass, a vehicle aerodynamic drag coefficient, and a tire rolling resistance; and wherein estimating is further based on the calibrated vehicle information.

4. The method of claim 3, further including storing the calibrated vehicle information; and periodically updating the calibrated vehicle information based on an actual fuel consumption achieved along a selected route.

5. The method of claim 1, further including determining an individual driving pattern for a given vehicle operator including at least one of the group consisting of a characteristic acceleration rate, a characteristic deceleration rate, a characteristic speed traveled corresponding to a route speed limit, a characteristic delay associated with encountering intersections, a characteristic delay associated with encountering traffic signals, and a characteristic vehicle accessory load; and wherein estimating is further based on individual driving pattern.

6. The method of claim 1, wherein estimating includes predicting a powertrain operating parameter for at least a segment of a given route based on the powertrain information.

7. The method of claim 1, wherein the electronic navigation system receives vehicle traffic information from an external source, and wherein the method further includes modifying estimated values for the amount of fuel required to travel along each of the plurality of alternate routes based on the vehicle traffic information.

8. The method of claim 1, further including transforming the navigation information for each route or route segment from distance and estimated travel time into a value representative of an amount of fuel used for each route or route segment.

9. The method of claim 8, further including displaying to the vehicle operator a value representative of fuel saved for at least one of the plurality of alternate routes relative to another of the plurality of alternate routes.

10. The method of claim 1, further including, upon selection by the vehicle operator of one of the plurality of alternate routes, monitoring an actual fuel consumption of the vehicle along the selected alternate route.

11. The method of claim 10, further including alerting the vehicle operator if an observed fuel economy differs significantly from an estimated fuel economy for the selected alternate route.

12. A method for operating an electronic navigation system to display to a vehicle operator a plurality of alternate vehicle travel routes between an identified starting point and an identified endpoint, wherein the electronic navigation system includes a computer readable medium storing navigation information including a plurality of route segments, distances of each of the plurality of route segments, speed limits of each of the plurality of route segments, grade changes of each of the plurality of route segments, altitudes of each of the plurality of route segments, and number and type of intersections and traffic signals encountered in each of the plurality of route segments, and wherein the vehicle includes an engine, a transmission, and a vehicle controller adapted to supply powertrain information to the electronic navigation system and calibrated vehicle information, the method comprising:

storing the powertrain information supplied by the vehicle controller as a function of vehicle speed, the powertrain information including a transmission selected gear, a state of any lockup torque converter of the vehicle, a state of a fuel-savings engine operating mode of the vehicle, an achieved fuel economy of the vehicle, and a fuel quality of fuel being used in the vehicle;

identifying a plurality of alternate routes from the starting point to the ending point based on the navigation information, each of the plurality of alternate routes including at least one route segment of the plurality of route segments;

for each alternate route of the plurality of alternate routes, estimating an amount of fuel required to travel along the alternate route based on the navigation information and the powertrain information and associating the amount of fuel with the alternate route;

displaying two or more of the alternate routes by the electronic navigation system, the two or more of the alternate routes including a most-fuel efficient alternate route, the most-fuel efficient alternate route having a least amount of fuel associated therewith;

determining whether the vehicle is operating in a fuel efficiency mode; and automatically setting the most-fuel efficient alternate route as a default route when the vehicle is operating in the fuel efficiency mode.

* * * * *